Feb. 4, 1958     L. S. GASSMAN     2,821,977
OPTICAL DEVICE
Filed Oct. 20, 1954
FIG. 1
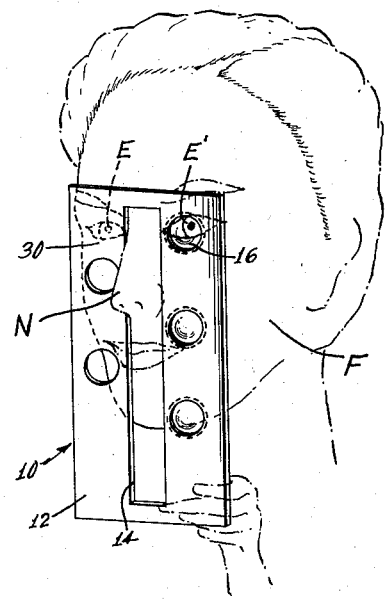
FIG. 2
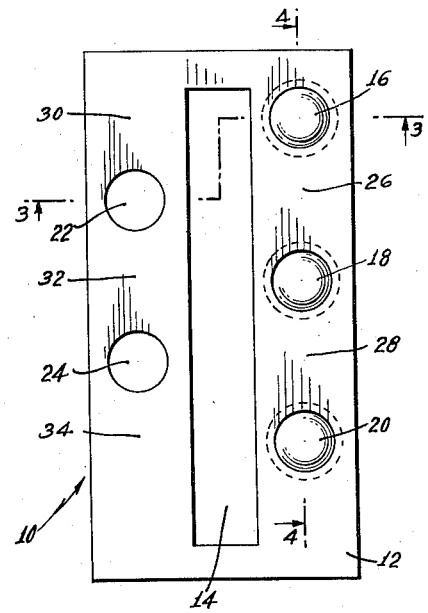
FIG. 3
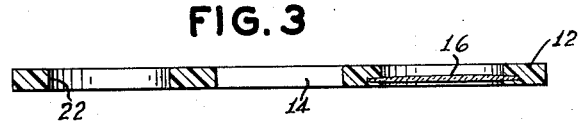
FIG. 4
FIG. 6
FIG. 5
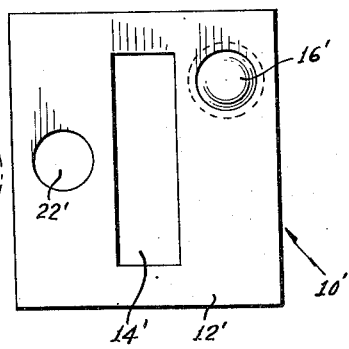
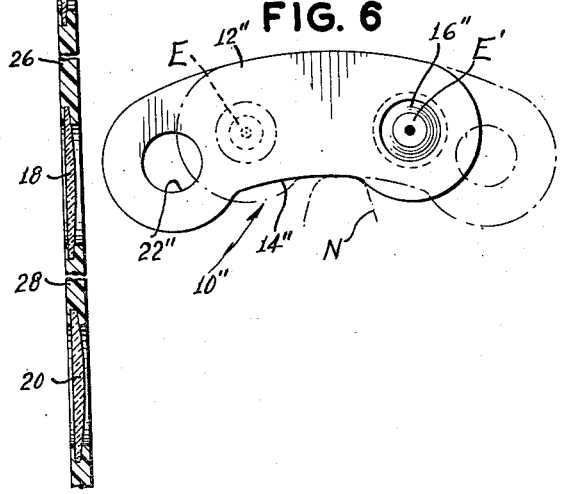
INVENTOR.
Lester S. Gassman
BY Edwin Leisohn &
Harry Cohen
ATTORNEYS

United States Patent Office 2,821,977
Patented Feb. 4, 1958

2,821,977

OPTICAL DEVICE

Lester S. Gassman, Metuchen, N. J.

Application October 20, 1954, Serial No. 463,576

4 Claims. (Cl. 128—76.5)

This invention relates generally to an optical device and, more particularly, to an eye exercising device which is adapted to stimulate the accommodation of the user's eyes.

One object of the present invention is the provision of a self-use eye exercising device which is adapted to stimulate the accommodation of the user's eyes by subjecting the latter to a technique in which the user's eyes are subjected to the action of a lens having a dioptric power stronger than the normally used corrective lenses or the naked eyes alternating with a lens of less dioptric power than the normally used corrective lenses or with an unimpeded aperture.

Yet another object of the present invention is the provision of an eye exercising device of the above character which is of simple design and construction, economical to manufacture, light in weight, and which is very easy to use.

The above and other objects, features and advantages of the present invention will be more fully understood from the following description considered in connection with the accompanying illustrative drawings.

In the drawings which illustrate the best modes now contemplated by me for carrying on my invention:

Fig. 1 is a front perspective view of an eye exercising device formed according to the present invention shown operatively positioned in relation to the user's eyes;

Fig. 2 is a front elevational view of the eye exercising device shown in Fig. 1;

Fig. 3 is a sectional view, on an enlarged scale, taken on the line 3—3 of Fig. 2;

Fig. 4 is a sectional view, on an enlarged scale, taken on the line 4—4 of Fig. 2;

Fig. 5 is a front elevational view of another form of eye exercising device; and Fig. 6 is a front elevational view of yet another form of eye exercising device.

Referring to the drawing and more particularly to Figs. 1 through 4 thereof, there is shown an eye exercising device 10 adapted for self-use for stimulating the accommodation of the user's eyes by subjecting the latter to a technique which will be fully described hereinafter. The eye exercising device 10 comprises a flat holder 12 having a medially disposed longitudinally extending vertical slot 14 for the reception of the user's nose in the manner shown in Fig. 1, said holder being vertically movable relative to the user's face F with the user's nose N projecting through the slot 14. The holder 12 is provided with a series of lenses 16, 18 and 20 of graduated dioptric power on one side of the slot 14 in uniformly vertically spaced relation, the lens 16 of the illustrated embodiment being the weakest lens of the series of lenses with the lenses 18 and 20 being progressively stronger than the lens 16. As will be apparent from the description which follows, the series of lenses 16, 18 and 20, which are graduated in dioptric power, will be of a strength related to the normally used corrective lenses or the naked eyes of the user. The holder 12 may be provided with any number of lenses which are graduated in dioptric power and, in practice, the weakest lens 16 of the series of lenses will be stronger than the normally used corrective lenses or the naked eyes of the user. By way of example, lens 16, which is the weakest lens of the series of lenses 16, 18 and 20, may be of —1.00 diopter, lens 18 may be of —2.00 diopter and accordingly slightly stronger than lens 16 and lens 20 may be of —3.00 diopter and thus slightly stronger than the intermediate lens 18 of the series of lenses.

At the opposite side of the slot 14, the holder 12 is provided with a pair of unimpeded circular apertures 22 and 24 which are disposed in vertically spaced and aligned relation and which are horizontally staggered relative to the series of lenses 16, 18 and 20 for a purpose which will be apparent from the description which follows. The series of lenses 16, 18 and 20 are spaced apart a distance greater than the diameter of the apertures 22 and 24 so that the latter will be horizontally aligned with an opaque or blanketing portion 26 and 28 respectively, of the holder 12. Thus the unimpeded aperture 22 will be horizontally aligned with an opaque area 26 of the holder 12 and the aperture 24 will be similarly aligned with an opaque area 28, it being noted that such opaque areas are defined by integral holder portions disposed between the series of lenses 16, 18 and 20. Horizontally aligned with the series of lenses 16, 18 and 20 at the opposite side of the holder from said lenses are opaque or blanketing areas 30, 32 and 34 which are adapted to blanket one eye when an opposite eye is in registry with one of said series of lenses. Thus when one of the user's eyes is in registry with one of the series of lenses or apertures the opposite eye will be blanketed by a companion opaque area or portion, the latter being defined by integral portions of the holder. In the illustrated embodiment the holder 12, which is formed of a suitable opaque material, is of rectangular configuration and the series of lenses and unimpeded apertures are uniformly vertically spaced and equi-distant from the slot 14.

When the user's nose N is associated with the slot 14 in a manner illustrated in Fig. 1, the series of lenses and apertures will be positioned in relation to the user's eyes E and E' so that by properly orienting the device 10 vertically of the user's face F the series of lenses and apertures may be brought into registry with the user's eyes. Each of the lenses and unimpeded apertures is spaced from its companion opaque portion a distance corresponding to the pupilary distance between the pair of eyes E and E' so that when a lens or aperture registers with one eye the opposite eye will be blanketed by an opaque portion of the holder 12. The series of lenses 16, 18 and 20 and the holder 12 may be of any desired configuration and may be formed of any suitable material, and, if desired, the series of lenses may be formed integral with the holder 12 with the latter and said series of lenses being molded of a suitable plastic material. It will also be apparent that the lenses 16, 18 and 20 may be formed separately from the holder 12 of any suitable material and may be integrated with the latter in any desired manner. If desired, the unimpeded apertures 22 and 24 provided with lenses of less dioptric power than the normally used corrective lenses of the user for the accomplishment of the technique to be hereinafter described. Thus the lenses 16, 18 and 20 may be formed of glass or a suitable plastic material and similarly the holder 12 may be formed of plastic or any other suitable material, it being understood that the portions 26, 28, 30, 32 and 34 will be opaque in order to blanket one eye when the opposite eye is in registry with either a lens or an unimpeded aperture.

In practice, the device 10 is positioned in close proximity to the user's face F with the user's nose N projecting through the longitudinal slot 14. The device 10 is manipulated to a vertical position in which the weakest lens 16 of the series of lenses is in registry with one of the user's eyes E', it being noted that in this position of the device the opposite user's eye E will be blanketed by the opaque area 30 of the holder 12. With the holder 12 so positioned the user sights through the lens 16 at a distant object and this position of the holder is maintained until such object is seen clearly. Thereafter the device 10 is vertically moved in an upward direction until the user's eye E is in registry with the aperture 22 and in this position of the device the eye E' will be blanketed by the opaque area 26. This position is maintained until the distant object is again seen clearly and this technique stimulates the accommodation of the user's eyes. The subjection of one of the user's eyes to the action of a lens or aperture will correspondingly affect the opposite eye as a result of the well known binocular effect. Accordingly when one eye is subjected to the action of one of the lenses or apertures the opposite eye will be substantially similarly affected as both eyes are interrelated by the well known binocular effect. It will thus be understood that the lens 16 when in registry with one of the user's eyes will exercise both eyes and similarly when the opposite eye is in registry with an unimpeded aperture both eyes will be relaxed so that a rocking action or effect is achieved by alternately associating a lens and aperture with one of the user's eyes. This technique utilizing lens 16 and aperture 22 is repeated at desired intervals until a distant object is seen clearly instantaneously or substantially instantaneously by the user. After the user has stimulated the accommodation of his eyes so that he can see a distant object clearly instantaneously with the use of the lens 16 and the aperture 22 the device 10 is positioned relative to the user's face so that the user's eyes will be subjected to the action of the next stronger lens 18 and the aperture 24. The technique aforedescribed will be repeated in the same manner described above utilizing the lens 18 and aperture 24. After the technique using the lens 18 and aperture 24 is successfully completed, such technique will be repeated using lens 20, which is the strongest lens of the series of lenses 16, 18 and 20, and the aperture 24. Thus after the user is able to sight a distant object through the lens 20 so that such object is seen clearly the user will manipulate the device 10 upwardly so that the user's eyes are in registry with the aperture 24 and its companion opaque area 28. Accordingly, each lens and its companion aperture are utilized repeatedly at desired intervals until the user is able to sight a distant object clearly instantaneously. The entire procedure or any phase of such procedure may be repeated using the series of lenses and apertures in association with the opposite eye by merely reversing the holder 12. Thus the device 10 is operative to stimulate the eyes and to make them function with decreased effort and strain as well as to increase the efficiency thereof. As previously pointed out the holder 12 may be provided with any number of lenses of graduated refractive power and it will be understood that in accordance with the procedure outlined above the weakest lens of the series of lenses will be the first lens utilized in association with the user's eyes.

With reference to Fig. 5, there is shown a device 10' which is similar to the device 10 described above except that the device 10' is provided with a single lens 16' and a single companion unimpeded aperture 22'. The device 10' is utilized in a manner previously described with reference to the device 10 and when the user is able to sight a distant object clearly instantaneously with the use of such device another device 10' may be utilized by the user having a lens stronger in refractive power than the lens 16'.

With reference to Fig. 6, there is shown an eye exercising device 10" which is functionally similar to the devices 10 and 10' described above, said device 10" comprising a flat holder 12" of generally arcuate configuration having a recessed or cutaway portion 14" for the reception of the user's nose N. The holder 12" is provided with a lens 16" of predetermined dioptric power corresponding to the lenses 16 and 16' described above and an unimpeded aperture 22" laterally spaced from each other a distance wider than the pupilary distance between the average user's pair of eyes. Pursuant to this arrangement the holder 12" is positionable relative to the user from the solid line position shown in Fig. 6 in which the eye E' registers with the lens 16" and the eye E is blanketed by a portion of said holder to the broken line position shown in said figure in which the eye E' is blanketed by another portion of the holder with the opposite eye E registering with the aperture 22". Thus when one eye is in registry with the lens 16" or the aperture 22" the other eye will be blanketed by an integral portion of the holder 12". Accordingly with the use of the device 10" it is merely necessary to laterally shift the holder 12" for moving the latter between positions in which one of the user's eyes is in registry with either the lens or its companion unimpeded aperture in accordance with the above described technique.

Thus while the devices 10 and 10' are vertically shiftable relative to the user's face the device 10" is laterally shiftable relative to the user's face between different positions in which either a lens or aperture is in registry with one of the user's eyes. Thus the user's eyes may be exercised in the manner described above in any number of graduated stages and the devices described above may include any desired number of stages which will correspond to the number of lenses utilized in the series.

It will also be understood that the various lenses described above may be of plus dioptric power for viewing objects at relatively close range, up to a distance of approximately six inches.

While I have shown and described the preferred embodiments of my invention, it will be understood that various changes may be made in the idea or principles of the invention within the scope of the appended claims.

I claim:

1. An eye exercising device of the character described, comprising a flat holder having a longitudinal slot for the reception of the user's nose, said holder having a lens of predetermined dioptric power and opaque means spaced corresponding to the pupilary distance between a pair of eyes at opposite sides of said slot, said holder being further provided with an unimpeded aperture and opaque means spaced corresponding to said pupilary distance at opposite sides of said slot with said lens and said aperture being disposed on opposite sides of said slot, said lens and said first mentioned opaque means being vertically spaced from said aperture and said last mentioned opaque means whereby in one position of said holder one eye registers with said lens and the other eye registers with said first opaque means and in another position of said holder said one eye registers with said second opaque means and said other eye registers with said aperture.

2. An eye exercising device of the character described, comprising a flat holder having a longitudinal slot for the reception of the user's nose, said holder having a lens of predetermined dioptric power and an unimpeded aperture at opposite sides of said slot in vertically spaced relation, said holder being vertically positionable relative to the user from a first position in which one eye registers with said lens and the other eye is blanketed by a portion of said holder to a second position in which said one eye is blanketed by another portion of said holder and said other eye registers with said aperture whereby to stimulate the accommodation of the user's eyes.

3. An eye exercising device of the character described, comprising a flat holder having a longitudinal slot for the reception of the user's nose, said holder having a series of lenses of graduated dioptric power on one side of said slot in vertically spaced relation and a series of unimpeded apertures at the opposite side of said slot in vertically spaced relation and horizontally staggered relative to said lenses, said holder being vertically positionable relative to the user from positions in which one eye registers with one of said lenses and the other eye is blanketed by said holder to other positions in which said one eye is blanketed by said holder and said other eye registers with one of said apertures whereby to stimulate the accommodation of the user's eyes.

4. An eye exercising device of the character described, comprising a flat holder having a longitudinal slot for the reception of the user's nose, said holder having a series of lenses of graduated dioptric power on one side of said slot in vertically spaced relation and a series of unimpeded apertures at the opposite side of said slot in vertically spaced relation and horizontally staggered relative to said lenses, said holder being vertically positionable relative to the user from positions in which one eye registers with one of said lenses and the other eye is blanketed by said holder to other positions in which said one eye is blanketed by said holder and said other eye registers with one of said apertures, whereby to stimulate the accommodation of the user's eyes, said lenses and said apertures being uniformly vertically spaced and equidistant from said slot, the latter being adapted for the reception of the user's nose to properly position said lenses and apertures in relation to the user's eyes.

References Cited in the file of this patent

UNITED STATES PATENTS

| | | |
|---|---|---|
| 1,204,690 | Ryer | Nov. 14, 1916 |
| 1,384,252 | Giddens | July 12, 1921 |